G. LIGHTFOOT.
Churn.

No. 16,210.

Patented Dec. 9, 1856.

UNITED STATES PATENT OFFICE.

GOODRICH LIGHTFOOT, OF ELGIN, ILLINOIS.

CHURN.

Specification of Letters Patent No. 16,210, dated December 9, 1856.

*To all whom it may concern:*

Be it known that I, GOODRICH LIGHTFOOT, of Elgin, in the county of Kane and State of Illinois, have invented a new and Improved Churn; and I do hereby declare that the following is a full, clear, and exact description of the same, reference being had to the annexed drawings, making a part of this specification, in which—

Figure 1:
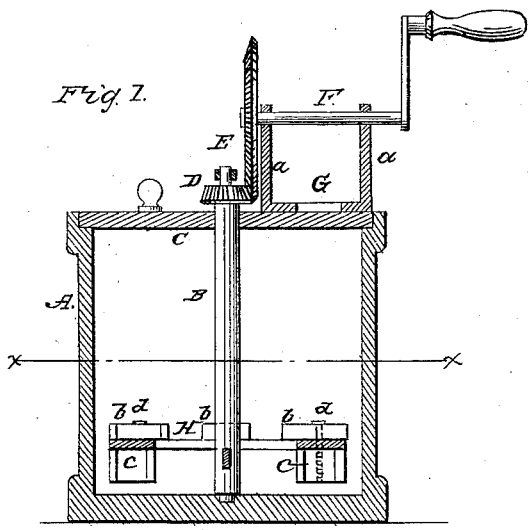
Figure 2:
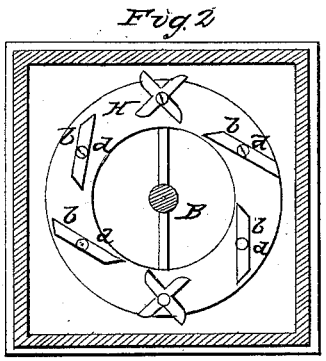
Figure 3:
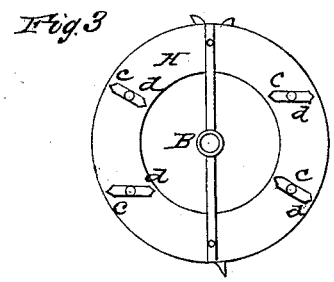

Figure 1, is a vertical section of my improvement, the plane of section being through the center. Fig. 2, is a horizontal section of ditto, $x$, $x$, Fig. 1, showing the plane of section. Fig. 3, is an inverted plan of the rotating dasher.

Similar letters of reference indicate corresponding parts in the several figures.

My invention consists in attaching a series of adjustable floats or buckets to the upper and under side of an annular plate which is attached to a rotating shaft, the shaft with the annular plate and floats being placed within a suitable box, as will be presently shown and described.

To enable those skilled in the art to fully understand and construct my invention, I will proceed to describe it.

A, represents a rectangular box having a vertical shaft B, fitted within it at its center. The lower end of this shaft is stepped in the bottom of the box and the upper end has its bearing in the cover C, of the box, which cover is formed of two equal parts.

The upper end of the shaft B, has a pinion D, upon it, and this pinion gears into a toothed wheel E, which is attached to the inner end of a shaft F. The shaft F, has its bearings in uprights $a$, $a$, attached to a plate G, on one part of the cover C. The plate G, is curved upward at its inner end and forms a bearing for the extreme upper end of the shaft. This arrangement allows the shaft and dasher to be readily removed from the box, reduces the cost of construction and the churn may be cleaned with but little expenditure of time and labor.

To the lower end of the shaft B, an annular plate A is attached. This plate is secured to one or more arms attached to the shaft B, and is nearly equal in diameter to the box A.

The plate A, has floats or buckets $b$, $c$, attached to its upper and lower surface, by bolts or screws $d$, which pass through their centers. These floats or buckets may be turned more or less angularly or obliquely so as to present a greater or less resisting surface to the cream, as desired, and consequently the cream may be subjected to a greater or less degree of agitation—as desired.

Motion is given the shaft B, by turning the shaft F, and it will be seen that the agitation commences at the bottom of the box A, and the motion given to the cream is such that the whole contents of the churn is equally exposed to the action of the atmosphere which is readily mixed or incorporated with the cream by the motion it receives, thereby producing the greatest amount of butter in the shortest time with a small amount of labor.

Having thus described my invention, what I claim as new and desire to secure by Letters Patent, is—

The adjustable floats or buckets $b$, $c$, attached to the annular plate A, which is secured to the shaft B, the above parts being arranged as shown for the purpose specified.

GOODRICH LIGHTFOOT.

Witnesses:
JAMES S. TAYLOR,
G. H. MERRILL.